United States Patent [19]
Guhman et al.

[11] Patent Number: 5,808,806
[45] Date of Patent: Sep. 15, 1998

[54] OPTICAL ELEMENT HAVING REGIONS OF DIFFERENT REFRACTIVE INDICES FOR REFRACTION OF LIGHT TRANSMITTED THERETHROUGH AND WHEREIN THE REGIONS FORM A REFRACTIVE LENS AND METHOD OF FABRICATING THE SAME

[75] Inventors: Glenn F. Guhman, Jericho; Michael Ray, Winooski; Theodore R. Touw, Westford, all of Vt.

[73] Assignee: International Business Machines Corporation, Armonk, N.Y.

[21] Appl. No.: 877,424

[22] Filed: Jun. 17, 1997

Related U.S. Application Data

[63] Continuation of Ser. No. 707,838, Sep. 9, 1996, abandoned, which is a continuation of Ser. No. 160,567, Dec. 1, 1993, Pat. No. 5,585,968.

[51] Int. Cl.⁶ ........................................ G02B 3/00
[52] U.S. Cl. .................... 359/654; 359/742; 359/900; 428/310.5; 428/312.6; 428/316.5
[58] Field of Search ................. 385/27, 31, 33; 359/558, 565, 569, 573, 575, 599, 652, 653, 654, 655, 707, 737, 721, 888, 896, 741, 742, 900; 65/105, 394, 399, 400, 425; 428/310.5, 312.6, 315.5

[56] References Cited

U.S. PATENT DOCUMENTS

| | | | |
|---|---|---|---|
| 4,445,759 | 5/1984 | Valette | 359/742 |
| 4,462,662 | 7/1984 | Lama | 359/663 |
| 4,524,127 | 6/1985 | Kane | 430/321 |
| 4,528,260 | 7/1985 | Kane | 430/321 |
| 4,670,033 | 6/1987 | Miura | 65/399 |
| 4,737,946 | 4/1988 | Yamashita et al. | 385/33 |
| 4,778,256 | 10/1988 | Serizawa | 430/2 |
| 4,878,724 | 11/1989 | Thaniyavarn | 372/33 |
| 4,912,014 | 3/1990 | Feldman | 428/310.5 |
| 4,936,666 | 6/1990 | Futhey | 359/573 |
| 4,948,214 | 8/1990 | Hamblen | 118/60 |
| 4,983,499 | 1/1991 | Suzuki et al. | 430/321 |
| 5,046,159 | 9/1991 | Hamanaka | 355/1 |
| 5,062,688 | 11/1991 | Okuda et al. | 359/619 |
| 5,085,977 | 2/1992 | Sugawara et al. | 430/321 |
| 5,164,945 | 11/1992 | Long et al. | 385/31 |
| 5,253,103 | 10/1993 | Boyd et al. | 359/329 |

FOREIGN PATENT DOCUMENTS

| | | | |
|---|---|---|---|
| 47-0012820 | 4/1972 | Japan | 359/654 |
| 57-040001 | 1/1982 | Japan | 359/894 |
| 58-166340 | 10/1983 | Japan | G03B 35/24 |
| 61-0188518 | 8/1986 | Japan | 359/894 |
| 61-248001 | 11/1986 | Japan | G02B 5/18 |
| 62-18502 | 1/1987 | Japan | G02B 5/18 |
| 2-0156204 | 6/1990 | Japan | 359/891 |
| 2255483 | 11/1992 | United Kingdom | 359/588 |

OTHER PUBLICATIONS

Suhara, et al., "Graded–Index Fresnel Optics for Integrated Optics", Applied Optics, vol. 21, No. 11, Jun. 1982, pp. 1966–1971.

W. Veldkamp, et al., "Binary Optics" Scientific American, vol. 266, No. 5, May 1992, pp. 92–97.

*Primary Examiner*—Paul M. Dzerzynski
*Assistant Examiner*—John Juba, Jr.
*Attorney, Agent, or Firm*—Heslin & Rothenberg, P.C.

[57] ABSTRACT

An optical device having a variable index of refraction across its surface includes a light transmissive material with a plurality of regions in the light transmissive material. Each region has an index of refraction which is different from the remainder of the material. The regions may be arranged in the surface of the material such that the density of the regions on the surface varies across the surface. Each region may be a bore, including a hole that extends through the light transmissive material. Variations in the density of the regions or bores as well as the depth and shape of the bores may be utilized to create variations of the refractive index within the light transmissive material. The regions form a refractive lens.

28 Claims, 2 Drawing Sheets

OPTICAL ELEMENT HAVING REGIONS OF DIFFERENT REFRACTIVE INDICES FOR REFRACTION OF LIGHT TRANSMITTED THERETHROUGH AND WHEREIN THE REGIONS FORM A REFRACTIVE LENS AND METHOD OF FABRICATING THE SAME

This application is a continuation, of application Ser. No. 08/707,838 filed Sep. 9, 1996, now abandoned, which is a continuation of application Ser. No. 08/160,567, now U.S. Pat. No. 5,585,968.

BACKGROUND OF THE INVENTION

TECHNICAL FIELD

Light transmitting optical elements such as lenses and prisms are generally made by shaping a material of uniform index of refraction. Typically, such optical elements are processed by grinding and polishing, as well as molding. Optical fiber elements are typically fabricated by grading to change the index of refraction of the fiber material while maintaining uniform fiber shape.

Recently, techniques for manufacturing optical elements such as lenses have been developed where holes are created into a body of a photo-transmissive material. The holes may be filled with another material having a refractive index higher than the refractive index of the substrate used as the phototransmissive material. This technique alters the index of refraction of the optical element. Additionally, the index of refraction of phototransmissive planar materials may be altered by contouring the surface of the planar material. However, these current techniques for creating light transmissive optical elements in a planar material do not adequately vary the index of refraction at different locations therein.

It is therefore desirable to create a planar light transmitting optical element having varying indexes of refraction throughout the surface thereof and at different locations thereon. Such light transmitting devices are desired to be used in visible light optical applications as well as infrared light applications.

It is also desirable to create a light transmitting element that can be more readily integrated with sensors fabricated in a semiconductor wafer.

DISCLOSURE OF THE INVENTION

The aforementioned goals may be achieved by constructing an optical device in accordance with the principles of the present invention. The optical device includes a surface of a light transmissive material; a plurality of regions in the surface where each region has an index of refraction different from the remainder of the material. The regions are arranged in the surface of the material such that the density of the regions on the surface is variable across said surface. Preferably, the surface of the light transmissive material is substantially planar. The surface may be comprised of a thin wafer of silicon.

Each region of the surface may be a bore. Each bore may have a width less than approximately one-tenth to one-thirtieth of the wavelength of radiation transmissible through the surface.

Each bore may also be a hole extending through the surface. The holes may have a width less than approximately one-tenth to one-thirtieth of the wavelength of radiation transmissible through the planar surface.

The bores may be of varying depth and/or may be tapered. The number of bores within said planar surface may vary in a first direction and/or a second direction. Also, the number of bores within the surface may vary radially from a central point on the planar surface.

The number of bores within the surface located towards the central point may be greater than the number of bores located radially away from said central point to allow the optical device to operate as a concave lens. The number of bores within the surface located towards said central point may also be less than the number of bores located away from the central point to allow the optical device to operate as a convex lens.

The aforementioned goals may also be achieved by a method of fabricating an optical device in accordance with the principles of the present invention. The method may involve creating a surface of a light transmissive material creating a plurality of regions in the surface where each region has an index of refraction different from the remainder of the material; and arranging the regions in the surface of the material such that the density of the regions on the surface is variable across the surface. Preferably, the surface of the light transmissive material is substantially planar.

Each created region may be a bore. Each bore may have a width less than approximately one-tenth to one-thirtieth of the wavelength of radiation transmissible through the planar surface. The bores may be of varying depths, and/or may be tapered.

The bores may also be holes extending through the planar surface. The holes may have a width less than approximately one-tenth to one-thirtieth of the wavelength of radiation transmissible through the surface.

The number of bores created within the surface may vary in a first direction and/or a second direction. The number of bores created within the surface may also vary radially from a central point. The number of bores created within the planar surface located towards said central point may be greater than the number of bores created away from the central point to enable the optical device operates as a concave lens. The number of bores created within the planar surface located towards said central point may be less than the number of bores located away from the central point to enable the optical device operates as a convex lens. The light transmissive material comprises a thin wafer of silicon. However, other crystalline semiconductors such as germanium, their oxides such as $SiO_2$, glasses such as borosilicates, plastics such as polymethyl methacrylate ("Plexiglas") and other materials otherwise suitable for optical elements may also be used. The bores may be created by using a lithographic process and reactive ion etching. For example, specific high-resolution lithographic processes such as electron-beam lithography, X-ray lithography, ion-beam lithography or holographic lithography may be used.

BRIEF DESCRIPTION OF THE DRAWINGS

The subject matter which is regarded as the invention is particularly pointed out and distinctly claimed in the claims at the conclusion of the specification. The invention, however, may best be understood by reference to the following detailed description taken in conjunction with the accompanying drawings in which:

BEST MODE FOR CARRYING OUT THE INVENTION

In accordance with the principles of the present invention, a light transmitting device may include a surface, preferably planar, of a light transmissive material having a uniform index of refraction. Within the planar surface are various regions which have an index of refraction which is different from the refractive index of the light transmissive material. The density of the regions on the surface varies across the surface. These regions change the local refractive index on the surface to produce an effective index which varies across the surface. The surface, therefore, does not have a uniform index of refraction, but a variable index of refraction thereacross.

Figure 1:
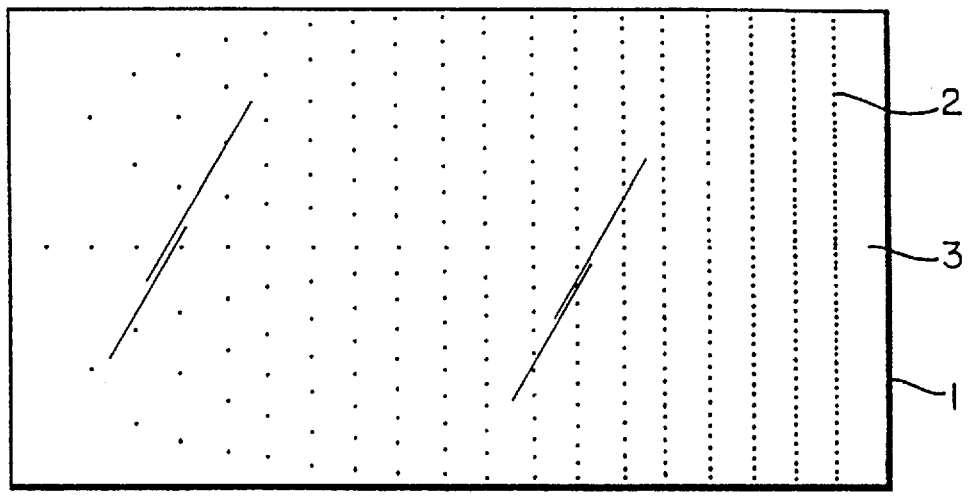
FIG. 1 depicts a top view of a light transmitting device constructed in accordance with the principles of the present invention having an index of refraction varying in one direction.

Referring to FIG. 1, a planar surface 3 of a light transmissive material 1 may contain a plurality of bores 2 therein. The bores 2 form regions which function to vary the effective refractive index of the light transmissive material 1. The refractive index of the light transmissive material may be varied by altering the number of bores (i.e., regions) within the particular area. For example, referring to the light transmissive material of FIG. 1, the planar surface 3 may be divided into half sides. The left half side containing a lower density, or less number of bores per unit area, than the right half side containing a higher density or higher number of bores per unit area. The higher the density of bores, the higher the reduction of the refractive index in that area of the planar surface. Therefore, the right half side of the planar surface in FIG. 1 will have a higher refractive index than the left half side. An average refractive index over a particular area of the planar surface may be achieved by selectively varying the density or number of bores in a planar surface of a light transmissive material.

Figure 2:
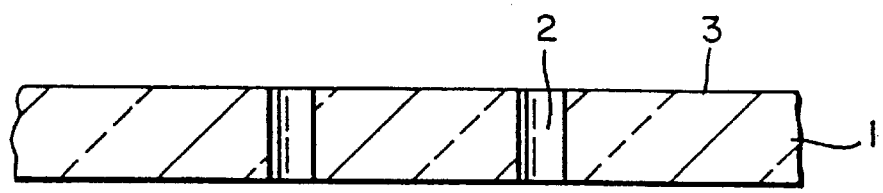
FIG. 2 depicts a bore within the planar surface of a light transmitting device such as that shown in FIG. 1.

FIG. 2 depicts a bore 2 in the form of a hole extending through the planar surface and completely through a light transmissive material 1. In accordance with the principles of the present invention, however, all bores need not extend through the planar surface. Variations in the depths of the bore, will produce a variation in the index of refraction of the planar surface. Generally, the deeper the bore, the higher the change in the index of refraction of the light transmissive material. The lateral dimensions of the bores, for example the diameter for round holes, should be smaller than the wave length of light which will pass through the planar surface of the light transmissive material. Preferably, the effective diameter of the lateral dimension should be less than approximately one-tenth to one-thirtieth the wavelength of light to be transmitted through the planar surface.

Figure 3:
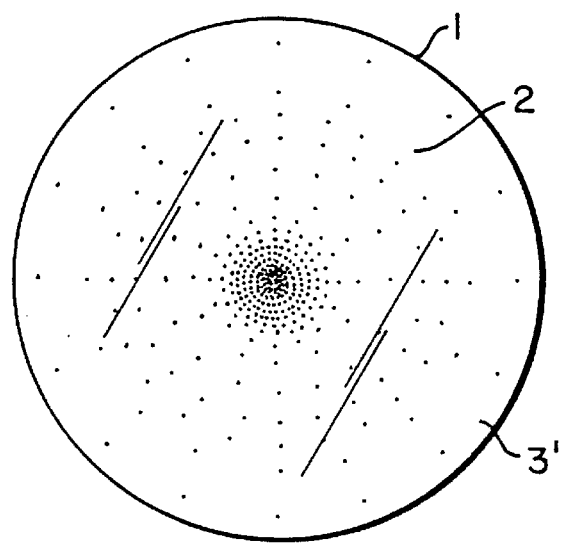
FIG. 3 depicts a top view of a light transmitting device having an index of refraction varying towards the center of a planar surface which acts as a concave lens.

Referring now to FIG. 3, a disc shaped planar surface 3' made of a light transmissive material 1 having a plurality of bores 2 therein is shown. To enable the planar surface with the bores therein to function as an equivalent to a concave lens, the density of the bores is greater in the center of the planar surface than at the outer edge thereof. The density of the holes 2 may vary uniformly along the radius of the disc shaped planar surface 3'. The holes along any imaginary circle or disc located at any particular radial dimension from the center are evenly spaced. The density of the bores 2, the number of bores per unit area, progressively increases along each imaginary ring within the disc shaped surface 3' towards the center of the surface 3'.

The density of the bores 2 may vary according to the suggested formula or similar relationship to achieve the equivalent of a conventional lens with a spherical planar surface 3'.

Figure 4:
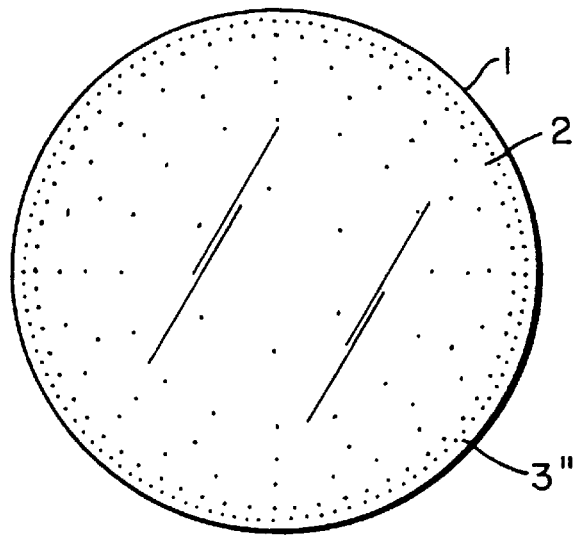
FIG. 4 depicts a top view of a light transmitting device having an index of refraction varying towards the center of a planar surface which acts as a convex lens.

FIG. 4 depicts another disc shaped planar surface 3" of a light transmissive material. However, the bores 2 therein are oriented such that the planar surface acts as the equivalent of a convex lens when light is transmitted therethrough. The density of the holes is greater towards the edge of the disc shaped planar surface. Also, the spacing of the bores along any imaginary ring at a given distance from the center of the planar surface should be equal so that the index of refraction is the same throughout such an imaginary ring.

Figure 5:
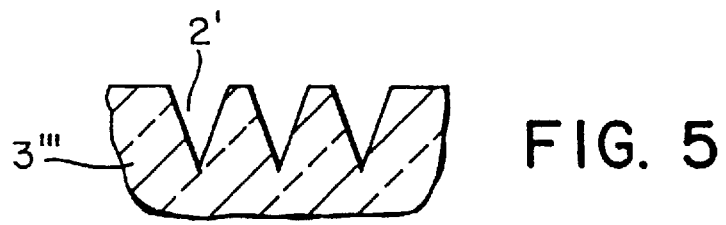
FIG. 5 depicts a sectional view from the side of a tapered bore within a planar surface of a light transmitting device constructed in accordance with the principles of the present invention.

Variations in the effective refractive index of a planar surface of a light transmissive material may be achieved not only by varying the density of bores within the planar surface, but varying the depth of the bores, and/or the width of the bores. A combination of varying density of bores and varying depths of bores may be used together to create a variation of the effective refractive index of the planar surface of a light transmissive material. For example, an area of a planar surface with high reflectivity may be modified to reduce the reflectance of certain surface areas by creating bores in certain patterns which result in a low effective index of refraction at the planar surface and a progressively higher index of refraction in areas of increasing depth. For example, in FIG. 5 a reduced reflective area may be formed by creating tapered bores 2' wherein the diameter of the bore decreases linearly with depth of the bore through the planar surface. A plurality of similar tapered bores 2' may be used to create an area of reduced reflectance.

Figure 6:
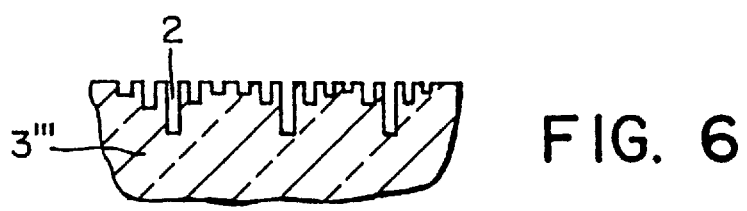
FIG. 6 depicts a sectional view from the side of a plurality of bores having varying depths within the planar surface of a light transmitting device such as that shown in FIG. 1.

FIG. 6 depicts an area of a planar surface of light transmissive material having a plurality of bores 2 therein of varying depths but of relatively equal diameter. Each bore 2 is created so that its depth is slightly larger than the depth of a closest bore. Along any given line in the planar surface 3'" the depth of bores progressively increases to a desired depth and then progressively decreases to a desired depth eventually progressively increasing again to a desired depth.

Figure 7:
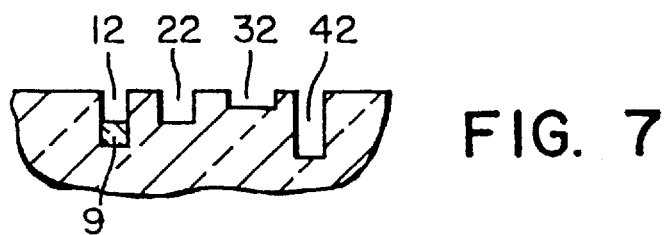
FIG. 7 depicts a sectional view from the side of a plurality of bores having varying depths and lateral dimensions within the planar surface of a light transmitting device constructed in accordance with the principles of the present invention.

Referring now to FIG. 7 varying the refractive index can also be achieved by varying the width of the bores 12, 22, 32, 42 as well as the density and depth of the bores. Also, variations in effective refractive index may be achieved by filling some or all of the bores with a transparent material 9 such as aluminum having a refractive index greater, or less than, the refractive index of the planar surface of light transmissive material or the average refractive index of the light transmissive material which has been altered with bores, 12, 22, 32, 42 therein. Also, to minimize unwanted diffraction of the light passing through the planar surface, bore positions may be randomly placed within a region of nominally uniform bore density on the planar surface (not shown).

In accordance with the principles of the present invention, an infrared optical light transmitting element or device may be formed using a uniformly thin wafer of silicon as a planar surface of light transmissive material. Preferably, the silicon should be a single crystal wafer such as the type which is commonly prepared for semiconductor processing. The silicon wafer may be doped to produce an initial refractive index for the planar surface. If desired, the silicon wafer may be made thinner in the specific areas which will be used as the planar surface for light transmission therethrough. Bores may then be made in the planar surface. The exact pattern will depend upon the desired variation of refractive index. The bores may be created in the silicon surface by various lithographic processes, for example, reactive ion etching processes commonly used in semiconductor processing. Moreover, these lithographic processes may be used to produce light transmitting devices in accordance with the principles of the present invention which are designed for transmitting the visible portions of the light spectrum. Commonly used lithographic processes are sufficient to create bores which are small enough compared to the wavelength of visible light. For example, electron beam lithography, ion beam lithography or X-ray lithography may be used to create sufficiently small bores and reactive ion etching may be used to etch the same size bores. Specific high-resolution lithographic processes such as electron-beam lithography, X-ray lithography, ion-beam lithography or holographic lithography may also be used. These light transmitting devices may be fabricated in a manner that many devices are formed simultaneously similar to the fabrication of semiconductor wafers.

Materials other than silicon may be used to create the planar surface of light transmissive material. For example, conventional optical glasses, germanium, silicon oxides, germanium oxides, ZnS, ZnSe, $CaF_2$, $BaF_2$, $Al_2O_3$, and polymers such as polymethyl methacrylate, as well as other light transmitting materials well known in the art may be used. Other crystalline semiconductors such as germanium, their oxides such as $SiO_2$, glasses such as borosilicates, plastics such as polymethyl methacrylate ("Plexiglas") and other materials otherwise suitable for optical elements may also be used.

In accordance with the principles of the present invention, the aforementioned lithographic processes including reactive ion etching may be used to alter and/or improve the performance of optical elements which have already been performed by conventional grinding and polishing. Alteration of the refractive index may be achieved by creating a pattern of small bores in one surface on a conventional lens, such as an infrared lens having a spherical aberration to be corrected. The bore pattern to be created must be calculated to produce a variation of the effect of refractive index corresponding to a correction plate made by conventional means. For example, (1) calculate a conventional correction plate to correct the aberration, wherein the plate would be made with a material of uniform refractive index (2) conceptually divide that conventional design into narrow zones, (3) for each such zone, calculate what index of refraction of the lens material would be required to be equivalent to that zone of the conventional corrector, (4) select suitable bore diameters and depths, and calculate the bore density needed to modify the original lens material to have that effective index, and (5) conceptually reassemble the various zones on the surface of the lens, with their respective bore densities. (If necessary vary both depth and density in step (4) for a given zone.)

Another point to mention in the specification is that there may be a preferred surface of a conventional element on which to perform the correction. If the conventional element were a plano-convex lens, it would be preferred to make the correction on the planar surface rather than on the convex surface, because the lithography would be much easier on the planar surface. In some cases, the curvature of a surface could require specific lithographic processes having sufficient depth of focus (e.g., X-ray lithography).

The light transmitting device constructed in accordance with the principles of the present invention may be easily integrated with sensors as compared to conventional optical elements. For example, infrared sensor integration whereby the sensors are formed on one side of the silicon wafer light transmitting substrate may be easily accomplished. Alternatively, a light transmitting device may be easily bonded to a separate silicon detector by anodic bonding. Also, grooves may be created by etching, or other well known techniques, in either the light transmitting device or a silicon sensor while cementing fiber optic elements into the grooves.

The elements and methods disclosed are especially useful and adaptable to integration of optical elements. For example, a prism made by the method described can be made contiguous to a photodiode junction near the surface of a semiconductor, and thereby direct light that is more or less normally incident on the wafer surface toward the photodiode junction. Similarly, but in the opposite direction, light emitted from the junction region of a light-emitting diode (LED) can be redirected by integrated optical elements of the present invention.

Although the invention has been described in conjunction with the embodiments herein, it will be apparent to one of ordinary skill in the art that various modifications may be made without departing from the scope of the invention as defined by the following claims.

What is claimed is:

1. An optical device comprising:
   a substrate made of light transmissive material having a surface thereon; and
   a plurality of regions in said surface, each region having an index of refraction different from the remainder of said material for locally changing a bulk refractive index of said material over a portion of said substrate for refraction of light transmitted through said portion, wherein each said region of the surface comprises a bore;
   said regions being arranged in the surface of said material such that the density of said regions on said surface varies across said surface, whereby said bores collectively form a refractive lens.

2. The optical device of claim 1 wherein said surface is substantially planar.

3. The optical device of claim 1 wherein said bores have at least one width less than approximately one-tenth of the wavelength of radiation transmissible through the surface.

4. The optical device of claim 1 wherein said bores comprise holes extending through the light transmissive material.

5. The optical device of claim 4 wherein said holes have at least one width less than approximately one-tenth of the wavelength of radiation transmissible through the surface.

6. The optical device of claim 1 wherein said bores are of at least one depth.

7. The optical device of claim 1 wherein at least one of said bores is tapered.

8. The optical device of claim 1 wherein the number of bores per unit area within said surface varies in a first direction.

9. The optical device of claim 1 wherein the number of bores per unit area within said surface varies radially from a central point.

10. The optical device of claim 9 wherein the number of bores within said surface located towards said central point is greater than the number of bores located away from said central point wherein said optical device operates as a concave lens.

11. The optical device of claim 9 wherein the number of bores within the said surface located towards said central point is less than the number of bores located away from said central point wherein said optical device operates as a convex lens.

12. The optical device of claim 1 wherein the surface comprises a thin wafer of silicon.

13. The optical device of claim 1 wherein at least a portion of at least one of the bores is filled with a transparent material having a refractive index different from the light transmissive material.

14. A method of fabricating an optical device comprising:
   creating a plurality of regions in a surface of a substrate made of light transmissive material, each region having an index of refraction different from the remainder of said light transmissive material for locally changing a bulk refractive index of said material over a portion of said substrate for refraction of light transmitted through said portion, wherein each created region comprises a bore; and
   arranging said regions in the surface of said material such that the density of said regions on said surface is variable across said surface, whereby said regions collectively form a refractive lens.

15. The method of claim 14 wherein said surface is substantially planar.

16. The method of claim 14 wherein said bores have at least one width less than approximately one-tenth of the wavelength of radiation transmissible through the surface.

17. The method of claim 14 wherein said bores comprise holes extending through the surface.

18. The method of claim 17 wherein said holes have at least one width less than approximately one-tenth of the wavelength of radiation transmissible through the surface.

19. The method of claim 14 wherein said bores are of at least one depths.

20. The method of claim 14 wherein at least one of said bores is tapered.

21. The method of claim 14 wherein the number of bores per unit area created within said planar surface varies in a first direction.

22. The method of claim 14 wherein the number of bores per unit area created within said surface varies radially from a central point.

23. The method of claim 22 wherein the number of bores created within said surface located towards said central point is greater than the number of bores created away from said central point wherein said optical device operates as a concave lens.

24. The method of claim 22 wherein the number of bores created within said planar surface located towards said central point is less than the number of bores located away from said central point wherein said optical device operates as a convex lens.

25. The method of claim 17 wherein said created surface of a light transmissive material comprises a thin wafer of silicon.

26. The method of claim 14 wherein said bores are created by using a lithographic process.

27. The method of claim 14 wherein said bores are created using reactive ion etching.

28. The method of claim 14 wherein at least a portion of at least one of the bores is filled with a transparent material having an index of refraction different from the light transmissive material.

* * * * *

UNITED STATES PATENT AND TRADEMARK OFFICE
CERTIFICATE OF CORRECTION

PATENT NO. : 5,808,806
DATED : September 15, 1998
INVENTOR(S) : Guhman et al.

It is certified that error appears in the above-identified patent and that said Letters Patent is hereby corrected as shown below:

In the Claims:
Claim 19, line 2, delete "depths", substitute therefor --depth--.

Signed and Sealed this

Twenty-fifth Day of May, 1999

Attest:

Q. TODD DICKINSON

*Attesting Officer*     Acting Commissioner of Patents and Trademarks